United States Patent Office 3,278,641
Patented Oct. 11, 1966

3,278,641
MODIFIED POLYOLEFINS
Vernon Lee Bell, Jr., Circleville, Ohio, assignor to E. I. du Pont de Nemours and Company, Wilmington, Del., a corporation of Delaware
No Drawing. Filed Feb. 25, 1963, Ser. No. 260,901
20 Claims. (Cl. 260—878)

This invention relates primarily to the improvement of polyolefins without detracting from the basic desirable properties of the polyolefins. More particularly, the invention relates to the improvement in toughness, chemical resistance, grease resistance, adhesion, printability, ultraviolet light resistance, dielectric properties, etc. of shaped articles of polyolefins, e.g. polyethylene, copolymers of ethylene and propylene and other polymers and copolymers of alpha-olefins.

The invention involves first forming an unsaturated polymer of a conjugated triolefin, wherein each double bonded carbon atom has at least one hydrogen atom, i.e. a copolymer of the triolefin with up to 99% by weight of one or more alpha-olefins or a homopolymer of the triolefin; and reacting the unsaturated polymer with a dienophilic compound selected from the group consisting of sulfur dioxide,

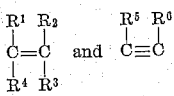

wherein at least one of $R_1$, $R_2$, $R_3$, and $R_4$ in the second-named compound and at least one of $R_5$ and $R_6$ in the third-named compound are selected from the group consisting of halide, carbonyl, carboxyl, carboalkoxy, acyl, aroyl, nitrile and trifluoromethyl and the remaining R's are selected from the group consisting of hydrogen, aryl, and alkyl having 1–6 carbon atoms, preferably at least one of the remaining R's is hydrogen. In an optional and preferred step, the unsaturated polymer is shaped into a useful article such as a film, filament, tube, rod, etc. prior to reaction with the dienophilic compound.

The important characteristics of the triolefins for use in the present invention are two: (1) the triolefins should be conjugated; and (2) the double bonded carbon atoms of the triolefins should bear at least one hydrogen atom. Hence, 1,3,5-hexatriene, 1,3,5-heptatriene and 2,4,6-octatriene are operable in the invention. Triolefins having longer chain alkyl groups are also operable.

The most important alpha-olefins for use in the invention are the most common, ethylene and propylene. However, alpha-olefins having longer carbon chains are also useful, particularly as copolymers with ethylene and propylene, to achieve special properties. Thus, 1-butene, 1-pentene, 1-hexene, 1-heptene, 1-octene, 1-decene, etc. are also operable.

The process for forming polymers of the conjugated triolefin, either alone or with up to 99% of at least one alpha-olefin involves polymerization in the presence of a coordination catalyst. The coordination catalyst is composed of a reducing agent having the empirical formula $R_aAlX_b$ where R is selected from the group consisting of aryl and alkyl having 1–6 carbon atoms, "$a$" being an integer having a value of 1–3, X being a halogen atom of atomic weight not greater than 80 and "$b$" being an integer having a value not greater than 2; and a reducible compound of a metal having an atomic number between 22 and 29, inclusive having the empirical formula $$MO_lX_m(OR)_n$$

the valence of the metal being designated as "$z$," and the subscripts "$l$" having the values of zero and one, "$m$" and "$n$" having the values of zero and that of a positive integer not greater than the valence "$z$" of the metal "M," wherein "$m$" is equal to ("$z$"–2) and "$n$" is zero when "$l$" is one and the sum of "$m$" and "$n$" is equal to "$z$" when "$l$" is zero; and, when "$n$" is equal to zero, said catalyst system contains an additional component, a compound which functions as an electron donor.

The reducible compounds of the coordination catalysts are usually oxygenated transition metal esters. However, any of the following may be used: triphenyl vanadate, triisopropyl titanate, triacetonyl vanadate, ethoxyvanadyl salicylate, 2-ethyl hexyl vanadate, tetraisobutyl titanate, tetra-n-butyl titanate, titanium tetrachloride, titanyl trichloride, isopropyloxytitanium trichloride, dibutoxy titanium dibromide, triisobutoxy titanium chloride, vanadyl dichloride, tributyl vanadate, tetraphenyl titanate, vanadium tetrachloride, vanadium trichloride, vanadium difluoride, cuprous chloride, ferric bromide, chromium chloride, manganese bromide, cobaltic chloride and nickel chloride.

Typical reducing agents falling within the above definition are: aluminum triisobutyl, aluminum triethyl, methylaluminum sesquichloride, methylaluminum sesquibromide, isobutoxyaluminum dichloride, isobutoxyaluminum dibromide, diisobutylaluminum acetylacetonate, ethylaluminum dichloride, ethylaluminum dibromide, butylaluminum dichloride, diethylaluminum chloride, diethylaluminum fluoride and ethylaluminum difluoride.

Compounds which function as electron donors may be used as part of the coordination catalyst system to provide additional effective combinations. Illustrative compounds which function as electron donors include anisole, tetrahydrofuran, dioxane, diethyl ether, dibutyl ether, and metal esters of transition metals such as tetraisopropyl titanate, tetra-n-butyl titanate, tetraphenyl titanate, tri (acetyl-acetonyl) vanadate and ethoxy vanadyl salicylate, which were previously listed as reducible components of the coordination catalyst system.

Specifically, the process for preparing the polymers involves subjecting the monomers, the triolefin and up to 99% of the alpha-olefin preferably in a hydrocarbon or halogenated hydrocarbon solvent to a temperature of −40° to 300° C. and a pressure of 1–3,000 atmospheres in the presence of the coordination catalyst for a contact time sufficient to form the polymer, usually at least 20 seconds for a continuous process and at least 3 minutes for a batch process, and then isolating the resulting polymer. Among the specific solvents which have been found useful in the present invention are hydrocarbons and halogenated hydrocarbons: hexane, heptane, benzene, toluene, cyclohexane, bromobenzene, chlorobenzene, o-dichlorobenzene, tetrachloroethylene, chlorotoluene, dichloromethane and 1,1,2,2-tetrachloroethane. Heterocyclic compounds such as tetrahydrofuran, thiophene and dioxane may also be used. The preferred solvents are the nonpolar and aromatic solvents, e.g. benzene, hexane, cyclohexane, dioxane, etc. In some instances, copolymerization may be effected without a solvent or in an emulsion or slurry system.

The coordination catalyst is used in catalytic amounts. Hence, the reducible component may vary anywhere from 0.01% to 1%, based on the weight of ultimate polymer. The ratio of the reducing agent to the reducible compound in the catalyst system may be as low as 2:1 and up to 8:1 and higher, preferably 2:1–4:1.

After isolating the polymer, the polymer is reacted with the dienophilic compound. This reaction may be performed at room temperature or by refluxing at elevated temperature. In fact, any temperature from −40° to 300° C. may be used provided that such temperature does not affect the reactants or the product adversely. The reaction may be carried out in the presence of a solvent for at least the dienophilic compound. As solvents, any of those mentioned previously with regard to polymerization may be used.

It should also be mentioned that the polymers may be formed into shaped articles, e.g. films, fibers, tubes, rods, net-like articles, etc., either before or after reaction with the dienophilic compound. If reaction is contemplated before shaping, then the polymer may be maintained in solution to avoid premature oxidation. If desired, an antioxidant may be incorporated in the polymer during or after polymerization; and, thus, avoid the necessity for maintaining the polymer in solution.

As dienophilic compounds, any falling within the previously defined group may be used. Almost any alpha-beta unsaturated carbonyl compound acid ester or anhydride which is capable of adding by 1,4-addition to a conjugated diene will be operable in this invention. In addition, such other strong dienophilic agents such as tetracyanoethylene, dicyanodi(trifluoromethyl)ethylene, perfluorobutyne as well as alpha-beta unsaturated nitriles are operable in this invention. Other operable dienophiles include: acrolein, crotonaldehyde, cinnamaldehyde, acrylic acid, methacrylic acid, crotonic acid, methyl methacrylate, cinnamic acid, methyl vinyl ketone, benzal acetone, benzal acetophenone, vinyl phenyl ketone, dibenzoylethylene, acrylonitrile, diacetylethylene, propargyl aldehyde, propiolic acid, phenyl-propiolic acid, acetylene dicarboxylic acid, methyl acetylene dicarboxylate, methyl propiolate, acetylene dicarbonitrile and ethyl 3,4-dihydronaphthoate.

In general, tetracyanothylene is used to impart or improve toughness, stiffness, resistance to aromatic solvents and dielectric properties to polymeric articles. Acrylonitrile and dicyanodi(trifluoromethyl)ethylene serve to improve oil and grease resistance. Acetylene dicarboxylic acid imparts toughness and adherence to printing inks to the articles. Dimethyl acetylene dicarboxylate, methyl acetylene dicarboxylate and maleic anhydride serve to improve adhesion to polymeric coatings. Acetylene dicarbonitrile serves to improve dielectric properties. Propiolic acid lowers static propensity. Perfluorobutyne provides flexibility and oil resistance in polymer films. Two-hydroxy-4-methacryloxybenzophenone imparts durability and resistance to ultraviolet light degradation.

The amount of the dienophile used will depend upon the amount of residual unsaturation in the conjugated triolefin polymer. Usually, an excess of the dienophile is used. However, any amount of the dienophile from about 1% to 200% or more by weight of the polymer may be used. Reaction of the polymer with the dienophile can be pictured as

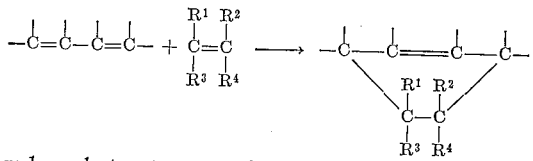

to reduce, but not necessarily eliminate, unsaturation.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [1] known to those skilled in the art. The majority of the infrared spectra herein were taken on pressed films by the use of a Perkin-Elmer Model 21 Spectrophotometer and a Perkin-Elmer Infracord Spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{relative viscosity}}{C}$$

[1] W. M. D. Bryant and R. C. Voter, Journal of American Chemical Society, 75, 6113 (1953); and F. W. Billmeyer, "Textbook of Polymer Chemistry," Chapter 7, Interscience Publishers 1957.

where relative viscosity is the ratio of the solution viscosity to the solvent viscosity, and C is the concentration of solute in solution measured as grams of polymer per 100 ml. of solution.

Example 1

A solution of 0.35 gram (1 mmole) of vanadium triacetylacetonate in 100 ml. of dry chlorobenzene is placed in a 200 ml. flask equipped with stirrer and gas inlets and outlets. Ethylene and propylene are passed over the stirred solution at rates of 50 and 25 ml./minute, respectively, for 5 minutes, after which 1 ml. of a solution of 3 ml. of trans-1,3,5-hexatriene in 7 ml. of chlorobenzene is added. Five mmoles of a 1:1 complex of anisole and diethyl aluminum chloride is added. The gas flows are continued for 1½ hours and the remainder of the triene solution is added dropwise. Acidified ethanol is added to precipitate a quantity of while, fluffy polymer. The polymer is washed with alcohol and dried in vacuo to give 4.2 gms. of polymer having an inherent viscosity (0.1 gm. in 100 ml. alpha-chloronaphthalene at 125°) of 0.40.

The polymer is melt-pressed at 110° to a thin, clear elastomeric film. The infrared spectrum is indicative of an amorphous ethylene/propylene/hexatriene terpolymer containing approximately 5% hexatriene with the preponderant unsaturation being that characteristic of a conjugated diolefin. The thin film (1.5 mils) is allowed to stand at room temperature for 48 hours in a 5% solution of 2-hydroxy-4-acryloxybenzophenone in benzene. At the end of that time the film is removel, washed well with ethanol and acetone, and dried. The infrared spectrum indicates the approximately 70% of the conjugated trans, trans-dienic absorption has been removed, while new bands attributable to the acrylate absorber have appeared in the carbonyl region. The film is tough and showed enhanced resistance to degradation by ultraviolet light.

This reaction can also be performed on a solution of the terpolymer in benzene, resulting in complete reaction in 5 hours, as indicated by complete disappearance of infrared absorption due to conjugated diolefin groups.

Example 2

Ten ml. of n-heptene (dried over calcium hydride) is placed in a flame-dried 50 ml. flask, equipped with stirrer, rubber stopper and blanketed with nitrogen. Aluminum triethyl, 4.8 mmoles, is injected via a syringe and the solution is cooled with ice. Five ml. (3.5 g. 0.045 mole) of pure trans-1,3,5-hexatriene is added followed by 0.50 ml. (1.6 mmoles) of titanium tetraisopropoxide. The deep red solution is stirred at ice temperature for 48 hours, after which the catalyst is inactivated with 5 ml. of acidified ethanol (3% HCl). The addition of ethanol precipitates a quantity of white, elastomeric polymer. The polymer is washed with cold ethanol, and freeze-dried with benzene to give 1.25 g. of hydrocarbon-soluble polymer. Clear, tough films can be cast from benzene solution.

The inherent viscosity of the polymer (0.5 g. in 100 ml. at 30°) is 0.92. The infrared spectrum of the polymer shows absorption bands indicating that a high percentage of the monomer has polymerized through a single vinyl group. The absorption at 985 cm.$^{-1}$ is typical of conjugated trans C—H and an equally intense absorption from conjugated vinyl C—H at 900–901 cm.$^{-1}$. The polymer is polyhexatriene having predominantly the structure:

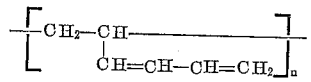

A solution of 1.6 g. (0.0125 mole) of tetracyanoethylene in 15 ml. of tetrahydrofuran is added to a solution of 1.5 gm. (0.02 mole) of the polyhexatriene in 20 ml. of dry benzene. The solution is stirred at room temperature for 3 hours. An additional 0.8 gm. of tetracyanoethylene is added, and the solution is refluxed for 1 hour. The solution is poured into methanol to precipitate the polymer (1.7 gms.), which is collected by filtration and washed well with ethanol and dried under reduced pressure.

Clear, tough films are cast from a solution in tetrahydrofuran. The infrared spectrum of the film indicates that much of the conjugated trans, trans-unsaturated at 895 cm.$^{-1}$ has disappeared, along with the conjugated vinyl absorption at 900 cm.$^{-1}$. The nitrogen analysis of 16.18% indicates that 38% of the theoretical diene content of the base polymer has reacted with tetracyanoethylene. Inherent viscosity of the polymeric adduct (0.5 g. in 100 ml. of tetrahydrofuran at 30°) is 0.88.

Following the procedure described above, 1,6-polyheptatriene and 1,6-polyoctatriene upon post-reaction with tetracyanoethylene also give polymer adducts rich in cyano groups.

Example 3

A solution of 1.0 gm. of 1,6-polyhexatriene in 10 ml. of benzene is agitated in a polymerization bottle with 5 ml. of liquid sulfur dioxide at 65–70° C. for 5 hours. The bottle is cooled to −25° C. and opened, and the excess sulfur dioxide is allowed to evaporate. The polymer solution is poured into cold ethanol to precipitate a white polymer. The polymer is dried under reduced pressure and redissolved in tetrahydrofuran. Clear, stiff films are cast from the solution. The infrared spectrum of this film shows that a portion of the conjugated trans, trans-diene absorption (985 cm.$^{-1}$) has been removed, while strong absorption bands at 1125 and 1300 cm.$^{-1}$ demonstrates the presence of cyclic sulfone structures in the polymer.

Example 4

Following the procedure described in Example 1, poly(1,3,5-hexatriene) and dicyanodi(trifluoromethyl)ethylene are reacted to the extent of about 50% as indicated by the partial disappearance of the conjugated diene band and with the development of carbon-fluorine absorptions in the infrared absorption spectra.

Example 5

Following the general procedure described under Example 1, maleic anhydride is reacted with a polyhexatriene comprising approximately 50% of the 1,2-polyhexatriene and 50% of 1,6-hexatriene at room temperature for 72 hours. The resulting product is soluble is tetrahydrofuran but is insoluble in benzene. An infrared absorption spectra on a film cast from tetrahydrofuran shows a reduced number of conjugated diene units than the original triene polymer.

Example 6

A solution of 0.17 g. (0.40 mmole) of tri-(2,6-xylyl)-vanadate and 0.020 ml. (0.20 mmole) of vanadyl trichloride in 55 ml. of dry chlorobenzene is placed in a 100 ml. flask equipped with stirrer and rubber stopper, and protected by a gentle flow of nitrogen. The solution is cooled to −25° C. and 3 ml. (3.0 mmoles) of a 1 molar solution of diethyl aluminum chloride in cyclohexane, to which a molar equivalent of anisole has been added, is injected into the flask. Five ml. (0.045 mole) of trans-1,3,5-hexatriene is added and the solution is stirred at −25° C. for 24 hours. The viscous mixture is cautiously poured into cold acidified ethanol (3% HCl) and the polymer which precipitates is collected, washed with cold ethanol, and freeze-dried with benzene. The inherent viscosity of the polymer (0.5 g. in 100 ml. benzene at 30°) is 0.61.

Sparkling clear, tough snappy films are cast from hydrocarbon solutions of the polymer. The infrared spectrum of the films shows a strong band of absorption at 985 cm.$^{-1}$, indicative of conjugated trans C—H linkages, and a lesser amount of absorption at 970 cm.$^{-1}$ (conjugated cis C—H linkages). Only a trace of vinyl absorption was noted at 910 cm.$^{-1}$. The identity of the absorption at 985 cm.$^{-1}$ is established as due to trans, trans-diene structure by its disappearance when a solution of the polymer was treated with dienophilic reagents. The polymer had predominantly the structure:

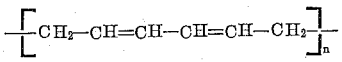

A reaction is carried out by heating equal parts of the polymer of 1,3,5-hexatriene and dimethyl acetylene dicarboxylate at reflux in benzene for 5½ hours at 80°. The product is soluble in benzene and is cast into a clear film which on infrared examination shows disappearance of the trans, trans-diene absorption at 985 cm.$^{-1}$ together with the appearance of strong ester absorptions at 1700–1750 cm.$^{-1}$ and at 1250 cm.$^{-1}$.

Example 7

A solution of 0.84 gm. (2 mmoles of tetraphenyl titanate and 2 mmoles of titanium tetrachloride in 75 ml. of dry benzene is placed in a 150 ml. flask, equipped with stirrer, gas inlet and outlet tubes, and rubber stopper. The solution is cooled with water at 10° and ethylene is passed over the stirred solution at 50 ml./minute for 2 minutes. Five ml. of a solution of 4 ml. of trans-1,3,5-hexatriene (2.86 gm., 0.036 mole) in 32 ml. of benzene is added, followed by 6 mmoles of aluminum triisobutyl. The ethylene flow is continued for 1½ hours while the remainder of the hexatriene solution is added dropwise over the same interval. At the end of 1½ hours, acidified ethanol (3% HCl) is added to inactivate the catalyst and precipitate polymer. The crude polymer is washed well with cold ethanol, and dried by pressing on filter paper.

Three and one-half grams of white polymer is obtained. The inherent viscosity of the polymer (0.1 g. in 100 ml. of alpha-chloronaphthalene at 125°) is 2.81. The polymer is melt-pressed at 125° C. to a clear, tough film. The infrared spectrum indicates approximately 10% of hexatriene had been incorporated into the polymer, by the amounts of conjugated trans, trans-(985 cm.$^{-1}$) and conjugated cis, trans-(970 cm.$^{-1}$) diene absorption bands.

Two grams of the ethylene/1,3,5-hexatriene copolymer is dissolved in 50 ml. of chlorobenzene at reflux. To this there is added one gram of tetracyanoethylene and the mixture is heated at 100° C. for 30 minutes. The solvent is evaporated and a portion of the remaining polymer is pressed into a tough film at 130° C. Inherent viscosity of the polymer (0.1 g. in 100 ml. of alpha-chloronaphthalene at 125° C.) is 2.42.

An infrared spectrum of the film shows complete disappearance of the absorption bands at 985 cm.$^{-1}$ and 970 cm.$^{-1}$, characteristic of the conjugated diolefin unsaturated of the original ethylene/1,3,5-hexatriene copolymer.

Example 8

A solution of 3.0 ml. of a 1 molar 1:1 complex of aluminum triisobutyl and anisole in cyclohexane is added to a solution of 1 ml. of vanadyl trichloride in 50 ml. of chlorobenzene in a reaction flask fitted with stirrer and flushed with nitrogen. The solution is cooled to −40° C. after which a solution of 5 ml. of 1,3,5-heptatriene in 25 ml. of chlorobenzene is added portion wise over a period of one hour while a stream of ethylene (25 ml./min.) and nitrogen (75 ml./min.) is passed over the stirred solution. The reaction is terminated by the addition of 5 ml. of 3% hydrochloric acid in ethanol. Further addition of ethanol precipitated 2.3 g. of polymer. A portion of the polymer is pressed at 150° C. to give a clear, tough film. Infrared analysis shows strong absorption at 985 cm.$^{-1}$. The copolymer contains about 50 weight percent of heptatriene units.

The film of ethylene/1,3,5-heptatriene copolymer is immersed in a 10% solution of tetracyanoethylene in benzene at room temperature for 4 hours. An infrared spectrum of the treated film shows that a major portion of the conjugated unsaturation of the copolymer has been removed and that absorption bands characteristic of nitrile groups had appeared.

Example 9

A solution of 1.50 ml. (1.5 mmoles of a 1 molar 1:1 complex of diethyl aluminum chloride and anisole in cyclohexane is added to a solution of 0.25 mmole of vanadyl trichloride in 20 ml. of chlorobenzene in a 50 ml. flask equipped with stirrer and nitrogen blanket. The purple, heterogeneous mixture is cooled to −35° and 4 ml. of a heptane solution containing 2.0 ml. (1.5 gm.) of pure trans, trans, trans-2,4,6-octatriene is added. A thick solution forms over 45 minutes and the catalyst is inactivated by the addition of acidified ethanol. The addition of cold ethanol precipitates a white polymer which is washed with ethanol and freeze-dried with benzene. The yield is 1.2 gm. (75%) and the inherent viscosity of the polymer (0.5 g. in 100 ml. benzene at 30°) is 0.99.

Clear, tough, flexible films are cast from a solution of the polymer in benzene. The infrared spectrum of the film shows a strong band of conjugated trans carbon-hydrogen absorption at 985 cm.$^{-1}$, with a shoulder at 970 cm.$^{-1}$ (conjugated cis).

The polyoctatriene polymer has predominantly the structure:

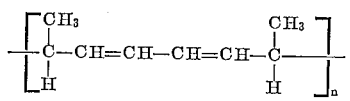

A solution of 1.0 g. of dicyanodi(trifluoromethyl)ethylene in 10 ml. of tetrahydrofuran is added to a solution of 0.5 g. of the polyoctatriene in 10 ml. of dry benzene. The solution is stirred at room temperature for 3 hours and is then heated at reflux for 30 minutes. The solution is poured into methanol to precipitate the polymer which is collected by filtration and washed well with ethanol and dried under reduced pressure. The yield (1.1 g.) and the nitrogen analysis (6.1%) indicate that about 70% of the theoretical diene content of the base polymer had reacted with the dicyanodi(trifluoromethyl)ethylene. An oil-resistant film was produced from the product by melt pressing at 130° C. and 30 tons pressure.

Example 10

A solution of 0.11 gm. (0.25 mmole) of tetraphenyl titanate and 0.04 ml. (0.40 mmole) of vanadyl trichloride in 50 ml. of dry benzene is prepared in a 125 ml. flask equipped with stirrer and blanketed with nitrogen. Two mmoles of aluminum triisobutyl are added and the catalyst is aged for 10 minutes at room temperature. The solution is then cooled with ice and a solution of 3 ml. of trans-1,3,5-hexatriene and 1 ml. of 1-hexene is added. The solution is then stirred for 24 hours at room temperature after which the thick solution is poured into cold acidified ethanol (3% HCl) to precipitate white polymer. The crude polymer is washed with cold ethanol, collected by filtration, and freeze-dried with benzene. A clear solution containing 2.0 g. of polymer was obtained. The inherent viscosity of the copolymer (0.5 g. in 100 ml. benzene at 30°) is 0.72.

Clear, flexible films are cast from the benzene solution. The infrared spectrum is indicative of copolymerization by the usual absorptions attributable to conjugated diene groups of 1,6-polyhexatriene (970 and 985 cm.$^{-1}$) and absorption bands associated with polyhexene units (methyl absorption at 1380 cm.$^{-1}$ and —CH$_2$ tetrameric absorption at 720 cm.$^{-1}$).

A solution of 0.5 g. of the 1-hexene/1,3,5-hexatriene copolymer in 15 ml. of dry benzene is added to a solution of 1.0 g. of perfluorobutyne in 10 ml. of dry benzene. The solution is stirred at room temperature for 3 hours and at 80° C. for 2 hours. The solution is poured into methanol to precipitate the polymer which is collected by filtration, washed with ethanol and dried under reduced pressure. Infrared analysis on a film cast from benzene solution showed that absorption bands at 970 and 985 cm.$^{-1}$, attributable to conjugated diene linkages in the base copolymer, were almost completely eliminated.

Example 11

Following the procedure of Example 10, 2 ml. of 1-decene and 2 ml. of trans, trans, trans-2,4,6-octatriene are copolymerized to a rubbery copolymer having an inherent viscosity of 0.68 (0.5 g. in 100 ml. of benzene at 30° C.) and showing an infrared spectrum characteristic of a conjugated diolefin.

To a solution of 0.5 g. of 1-decene/2,4,6-octatriene copolymer in 10 ml. of dry benzene there is added a solution of 1.0 g. of acrylonitrile in 20 ml. of dry benzene. The solution is stirred at room temperature for 2 hours and at 80° C. for 3 hours. The solution is poured into methanol to precipitate the polymer which is collected on a vacuum filter, washed with ethanol and dried in a vacuum oven at 50° C. A very flexible film having very good oil resistance is cast from a benzene solution of the product. The product has an inherent viscosity (0.5 g. in 100 ml. of benzene at 30° C.) of 0.64. The infrared spectrum shows absence of absorption bands attributable to conjugated diolefin.

In the following table, Examples 12–27 are outlined. The polymers were prepared substantially as in the previous examples. The polymers were pressed into films and then reacted with the dienophile.

| Example | Polymer | Dienophile | Characteristics of Product |
|---|---|---|---|
| 12 | Ethylene, propylene, 1,3,5-hexatriene (conj. diene in main polymer chain). | Tetracyanoethylene | Tough film, stiffer than ethylene/propylene copolymer film. |
| 13 | Ethylene/1,3,5-heptatriene 50% triene (conj. diene units in main polymer chain). | ___do___ | Tough film, resistant to aromatic solvents. |
| 14 | Ethylene/1,3,5-hexatriene-10% triene (conj. diene units in main polymer chain). | ___do___ | Tough film having improved resistance to aromatic solvents. |
| 15 | 1-hexene/1,3,5-hexatriene 70% triene (conj. diene units in main polymer chain). | Acrylonitrile | Oil resistant film. |
| 16 | Propylene/2,4,6-octratriene 50% triene (conj. diene units appended). | Tetracyanoethylene | Film has higher dielectric constant than polypropylene control. |
| 17 | Propylene/1,3,5-hexatriene 25% triene (conj. diene units in main polymer chain). | Dimethyl acetylene dicarboxylate. | Film shows improved adhesion to vinylidene chloride copolymer coatings. |
| 18 | Propylene/1,3,5-hexatriene 20% triene (conj. diene units appended to polymer chain). | Maleic anhydride | Film shows excellent adhesion to vinylidene chloride copolymer coatings. |
| 19 | Ethylene, propylene,1,3,5-hexatriene-15% triene conj. diene units in main polymer chain). | 2-hydroxy-4-methacryloxybenzophenone. | Film resistant to ultraviolet light degradation and good durability. |
| 20 | 1-octene/1,3,5-heptatriene 50% triene (conj. diene units in main polymer chain). | Acetylene dicarbonitrile | Composition has improved dielectric properties. |
| 21 | Ethylene/1,3,5-hexatriene 15% triene (conj. diene units appended to polymer chain). | Dicyanodi(trifluoromethyl) ethylene. | Film with improved oil resistance. |
| 22 | 1-butene/2,4,6-octatriene 40% triene (conj. diene units appended to main polymer chain). | Perfluorobutyne | Flexible, oil resistant film. |
| 23 | Ethylene/1,3,5-hexatriene 15% triene (conj. diene units appended to main polymer chain). | Acetylene dicarboxylic acid. | Tough film, readily printable. |
| 24 | 1-decene/2,4,6-octratriene 40% triene (conj. diene units in main polymer chain). | Sulfur dioxide | Forms compatible blend with polyacrylonitrile. |
| 25 | Ethylene/1,3,5-hexatriene 15% triene (conj. diene units appended to main chain). | Methyl acetylene dicarboxylate. | Film shows good adhesion to vinylidene chloride coatings. |
| 26 | Ethylene/1,3,5-heptatriene 10% triene (conj. diene units in main chain). | Propiolic acid | Film shows lower static propensity. |
| 27 | 1-octene/2,4,6-octatriene 50% triene (conj. diene units in main chain). | Dicyanodi(trifluoromethyl) ethylene. | Composition has improved oil resistance and dielectric properties. |

What is claimed is:
1. The reaction product of a polymer of a conjugated triolefin wherein each double bonded carbon atom bears at least one hydrogen atom and 0–99% by weight of at least one alpha olefin having 2–10 carbon atoms and a dienophilic compound selected from the group consisting of sulfur dioxide,

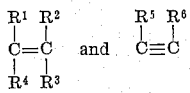

wherein at least one of $R_1$, $R_2$, $R_3$ and $R_4$ in the second-named compound and at least one of $R_5$ and $R_6$ in the third-named compound are selected from the group consisting of halide, carbonyl, carboxyl, carboalkoxy, acyl, aroyl, nitrile, and trifluoromethyl and the remaining R's are selected from the group consisting of hydrogen, aryl, and alkyl having 1–6 carbon atoms.

2. The reaction product of claim 1 wherein said conjugated triolefin of said polymer is 1,3,5-hexatriene.
3. The reaction product of claim 1 wherein said conjugated triolefin of said polymer is 1,3,5-heptatriene.
4. The reaction product of claim 1 wherein said conjugated triolefin of said polymer is 2,4,6-octatriene.
5. The reaction product of claim 1 wherein at least one alpha olefin of said polymer is ethylene.
6. The reaction product of claim 1 wherein at least one alpha olefin of said polymer is propylene.
7. The reaction product of claim 1 wherein at least one alpha olefin of said polymer is 1-hexene.
8. The reaction product of claim 1 wherein said dienophilic compound is sulfur dioxide.
9. The reaction product of claim 1 wherein said dienophilic compound is 2-hydroxy-4-acryloxybenzophenone.
10. The reaction product of claim 1 wherein said dienophilic compound is tetracyanoethylene.
11. The reaction product of claim 1 wherein said dienophilic compound is dicyanodi(trifluoromethyl)ethylene.
12. The reaction product of claim 1 wherein said dienophilic compound is maleic anhydride.
13. The reaction product of claim 1 wherein said dienophilic compound is dimethyl acetylene dicarboxylate.
14. The reaction product of claim 1 wherein said dienophilic compound is acrylonitrile.
15. The reaction product of claim 1 wherein said dienophilic compound is 2-hydroxy-4-methacryloxybenzophenone.
16. The reaction product of claim 1 wherein said dienophilic compound is acetylene dicarbonitrile.
17. The reaction product of claim 1 wherein said dienophilic compound is perfluorobutyne.
18. The reaction product of claim 1 wherein said dienophilic compound is acetylene dicarboxylic acid.

19. The reaction product of claim 1 in the form of a film.
20. A process which comprises subjecting a conjugated triolefin wherein each double bonded carbon atom bears at least one hydrogen atom and 0–99% by weight of at least one alpha olefin having 2–10 carbon atoms to a temperature of $-40°$ to $300°$ C. and a pressure of 1–3,000 atmospheres in the presence of a coordination catalyst composed of a reducing agent having the empirical formula $R_aAlX_b$ where R is selected from the group consisting of aryl and alkyl having 1–6 carbon atoms, "$a$" being an integer having a value 1–3, X being a halogen atom of atomic weight not greater than 80 and "$b$" being an integer having a value not greater than 2; and a reducible compound of a metal having an atomic number between 22 and 29, inclusive, having the empirical formula $MO_lX_m(OR)_n$, the valence of the metal being designated as "$z$", and the subscripts "$l$" having the values of zero and one, "$m$" and "$n$" having the values of zero and that of a positive integer not greater than the valence "$z$" of the metal "M," wherein "$m$" is equal to ("$z$"−2) and "$n$" is zero when "$l$" is one and the sum of "$m$" and "$n$" is equal to "$z$" when "$l$" is zero and, when "$n$" is equal to zero, said catalyst system contains an additional component, a compound which functions as an electron donor, for a time sufficient to form a polymer; shaping said polymer into the form of a film; and subjecting said film to a dienophilic compound selected from the group consisting of sulfur dioxide,

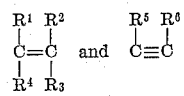

wherein at least one of $R_1$, $R_2$, $R_3$ and $R_4$ in the second-named compound and at least one of $R_5$ and $R_6$ in the third-named compound are selected from the group consisting of halide, carbonyl, carboxyl, carboalkoxy, acyl, aroyl, nitrile, and trifluoromethyl and the remaining R's are selected from the group consisting of hydrogen, aryl, and alkyl having 1–6 carbon atoms for a time sufficient to reduce residual unsaturation in said polymer substantially.

References Cited by the Examiner
UNITED STATES PATENTS

| | | | |
|---|---|---|---|
| 2,962,488 | 11/1960 | Horne | 260—88.2 |
| 3,095,406 | 6/1963 | Short et al. | 260—82.5 |
| 3,203,936 | 8/1965 | Breslow et al. | 206—79.3 |

FOREIGN PATENTS 822,742  10/1959  Great Britain.

MURRAY TILLMAN, Primary Examiner.

N. F. OBLON, Assistant Examiner.